(12) United States Patent
Vdovin

(10) Patent No.: US 12,502,248 B2
(45) Date of Patent: Dec. 23, 2025

(54) FINISHING ENDODONTIC FILE AND METHOD OF USE THEREOF

(71) Applicant: NOVABRUSH LTD., Moscow (RU)

(72) Inventor: Vasily Olegovich Vdovin, Moscow (RU)

(73) Assignee: NOVA BRUSH LTD., Tashkent Region (UZ)

( * ) Notice: Subject to any disclaimer, the term of this patent is extended or adjusted under 35 U.S.C. 154(b) by 232 days.

(21) Appl. No.: 18/494,987

(22) Filed: Oct. 26, 2023

(65) Prior Publication Data

US 2024/0341919 A1 Oct. 17, 2024

(30) Foreign Application Priority Data

Apr. 14, 2023 (EA) .................... 202300028

(51) Int. Cl.
*A61C 5/42* (2017.01)
*A61C 1/12* (2006.01)

(52) U.S. Cl.
CPC ........... *A61C 5/42* (2017.02); *A61C 1/12* (2013.01); *A61C 2201/00* (2013.01)

(58) Field of Classification Search
CPC .... A61C 5/40; A61C 5/42; A61C 5/46; A61C 1/12; A61C 2201/00; A61B 17/3207; A61B 17/1615; A61B 17/320758; Y10T 83/9292
See application file for complete search history.

(56) References Cited

U.S. PATENT DOCUMENTS 3,330,040 A * 7/1967 Kahn ................. A61C 5/44
433/102
6,589,052 B1 * 7/2003 Wilcko ............... A61C 5/42
433/102
(Continued)

FOREIGN PATENT DOCUMENTS

DE 9107924 U1 8/1991
EP 3045141 A1 7/2016
(Continued)

OTHER PUBLICATIONS

Search Report for Eurasian Pat. App. No. 202300028, dated Apr. 14, 2023 (2 pages).

*Primary Examiner* — Thomas C Barrett
*Assistant Examiner* — Matthew P Saunders
(74) *Attorney, Agent, or Firm* — FINNEGAN, HENDERSON, FARABOW, GARRETT & DUNNER, LLP

(57) ABSTRACT

The present invention relates to dentistry, and particularly, to a rotary endodontic finishing file used for root canal treatment. The endodontic finishing file comprises a shank for inserting in an endodontic motor handpiece, and a core of twisted metal braids secured in the shank, the said core being provided with an outer braid made of wire wound over the core. The length of the braid is less than the length of the core. At the braid-free end of the core, a brush of the core braids is formed. The winding of the wire of the outer braid is made in four layers, the winding of the first and third layers is made in the direction from the shank to the brush without a gap between the adjacent coils in each layer, the winding of the second and fourth layers is made in the opposite direction.

7 Claims, 6 Drawing Sheets

(56) References Cited

U.S. PATENT DOCUMENTS

| | | | | |
|---|---|---|---|---|
| 2007/0099149 | A1* | 5/2007 | Levy | A61C 5/42 433/102 |
| 2010/0105004 | A1* | 4/2010 | Levy | A61C 5/42 433/102 |
| 2011/0212413 | A1* | 9/2011 | Becker | A61C 5/42 433/102 |
| 2014/0045142 | A1* | 2/2014 | Becker | A61C 5/42 433/102 |
| 2019/0099240 | A1* | 4/2019 | Bansal | A61C 5/48 |
| 2019/0117334 | A1* | 4/2019 | Wildey | A61C 5/40 |
| 2023/0109107 | A1* | 4/2023 | Becker | A61C 5/40 433/102 |

FOREIGN PATENT DOCUMENTS

| | | | | |
|---|---|---|---|---|
| KR | 101852525 B1 * | 4/2018 | | A61C 5/40 |
| RU | 2627474 C2 | 12/2015 | | |
| RU | 186960 U1 * | 2/2019 | | A61C 5/42 |
| WO | WO 2013/076717 A1 | 5/2013 | | |
| WO | WO 2021/181378 A1 | 9/2021 | | |

* cited by examiner

FINISHING ENDODONTIC FILE AND METHOD OF USE THEREOF

CROSS-REFERENCE TO RELATED APPLICATIONS

This application claims priority to Eurasian patent application No. 202300028, filed on Apr. 14, 2023, which is hereby incorporated by reference in its entirety.

The invention relates to dentistry, and particularly, to a rotary endodontic finishing file used for root canal treatment.

The said files are inserted in standard endodontic motor handpieces and are intended for cleaning the root canals of the remnants of the smear layer, dentin chips, organic debris after the shaping of the intracanal space and prior to the subsequent filling of the canals.

BACKGROUND OF THE INVENTION

There is known an "Injection molded endodontic brush" according to U.S. Pat. No. 6,981,869 B2, publication 2006 Jan. 3, in which unitary, one-piece plastic molded microbrushes are used to remove the smear layer that remains in the root canal after the pulp residues have been mechanically and/or chemically removed from it using rotary cutting burs, files, various chemical reagents and other means. The brushes include a shank and a core inserted therein, wherein a plurality of bristles radially extending from the core are attached. The brushes are injection molded from an FDA approved resin. The disadvantage of this invention is the weak resistance of the brush material to acids and other substances used to dissolve organic debris in the root canal, as well as insufficient mechanical strength, which results in abrasion of the bristles and clogging of the root canal with their residues.

There is known an endodontic file comprising two wires secured at a shank, the free ends of which are joined together in a basket form, forming a working section of the file (International publication WO 2018/002951 A1 dated 2018 Jan. 4; U.S. Pat. No. 6,179,617 B1, publication 2001 Jan. 30). The wires may be made of stainless steel, as well as various heat-resistant alloys, including nitinol, tantalum, titanium, etc.

The main disadvantage of such devices is the risk of file breakage at the point where the wires are secured at the shank due to the small thickness of the wires (diameter of about 0.2 mm) and the high loads acting on the wires during file rotation and their contact with the walls of the tooth root canal, which does not contribute to high-quality and safe treatment.

There is known a "Rotary endodontic file with frictional grip" according to Patent RU 2563361 C2, publication 2011 Feb. 22, in which the file is composed of a shank made of elastomeric material, a core, and a helical wire partially surrounding the core along its length, which are secured at the shank. The shank is inserted in the endodontic motor handpiece and is supported therein by frictional forces. The core may be made of 15 to 25 twisted thin stainless steel wires, the free ends of which are welded together to form a hemispherical globule preferably having the same diameter as the core, i.e. between 0.2 mm to 0.3 mm. The core is longer than the helical wire. The helically wound wire may be made of stainless steel having a diameter of 0.2 to 0.4 mm. A part of the helical wire near the border of the exposed portion of the core may be made tapered with its apex facing towards the globule, obtained by grinding, polishing or etching process of the outer part of the helical wire, while the gap between the core and the inner diameter of the helical wire remains unchanged. The exposed portion of the core and the part of the helical wire adjacent thereof may be coated with an abrasive layer. According to the authors, this technical solution contributes to better removal of debris. However, this design may cause clogging of the lateral tubules with products obtained during the tooth root treatment, which enter and accumulate in the lateral branches of the tooth root (tubules). When rotating at high speed, the tip of the file, under the action of centrifugal force, is pressed against the surface of the root canal of the tooth, and, given the deviation of the surface of the canal from the correct cylindrical shape, will drive the organic debris and other materials to be removed from the canal into the lateral root tubules. Also, the negative effect will increase when abrasive materials applied to the core and/or helically wound wire are used, since in the process of abrasive treatment of the canal, fine dust is formed, which is not removed, but smeared on the walls of the canal, clogging the lateral tubules of the tooth root. Thus, the quality of treatment, preparation of the canal and safety of treatment (taking into account the risk of re-inflammation) are not ensured, which can lead to infections and the development of pulpitis, root cyst, periostitis and other diseases.

There is known an "Endofile" according to Patent RU 2607166 C2, publication 2012 Apr. 1, which is a further improvement of the design provided in the previous art (Patent RU 2563361). The main difference between this endofile and the invention provided in Patent RU 2607166, is the design of the core, which is made in the form of a central wire around which the inner strands (4-10) are twisted, and the outer strands (8-15) are wound around them, the outer strands being wound in an identical direction to that of the helically wound wire and opposite to the twisting direction of the inner strands. The core diameter is 0.15 mm to 0.3 mm, the diameter of the inner and outer strands is 0.10 mm to 0.15 mm. The diameter of the helically wound wire is 0.2 mm to 0.4 mm. The core may be made of nickel-titanium wire or stainless steel wire. The strands and helically wound wire are made of stainless steel. At the free end of the core, the inner strands are connected to the central wire, and the tip of the core is being chamfered. The free ends of the outer strands are unbonded, which allows them on insertion of the file into a narrow root canal to squeeze, forming a spherical bulb and releasing the free end of the core with the inner strands, and unwind when the file is withdrawn from the canal, forming a brush which sweeps away organic and other debris remaining after root canal treatment by the irrigation liquid. Whereby, when withdrawing the file from the canal, the tip of the endodontic motor is rotated clockwise, the helical winding will be tightened since it is wound clockwise, as is the winding of the inner strands, and the outer strands will unwind owing to their being wound anti-clockwise. The outer surface of the helical winding may be coated with an abrasive layer. The authors believe that the formation of a brush at the free end of the file should improve the quality of root canal treatment and reduce the treatment time compared to known endofiles, however, the use of a high-speed rotating brush formed from wires with sharp ends for canal treatment will lead to the appearance of many ledges on the walls of the canal, which may become clogged with chips, remnants of the smeared layer and organic debris and are difficult to remove, resulting in infections and development of pulpitis, root cyst, periostitis and other diseases. Also, an additional risk of complications is promoted by the presence of an abrasive layer on the outer surface of the helical winding, because at high processing speeds of 6000 to 30000 rpm, the friction of the abrasive layer will inevitably lead to the rapid release of a large amount of heat. Exceeding the safe temperature threshold of the apical part of the root can lead to serious damage. The safe temperature threshold is considered to be 44° C. The normal temperature of the external tissues surrounding the tooth root is considered to be 37° C.

In addition, the use of a friction grip in the invention using an elastomeric material, as is done in Patent RU 2563361, does not provide reliable securing of the shank of the endofile in the endodontic motor handpiece, since the fixing force of the grip will change with the wear of its elements in the course of endofile operation, which may be a source of injury when the endofile falls out caused by accidental external impact.

Thus, the proposed endofile according to Patent RU 2607166 also cannot provide high-quality and safe treatment. In addition, it has a complicated design, which makes it difficult to manufacture and increases production costs.

The closest art to the claimed endofile chosen as a prototype, is a utility model "Endodontic file" (Patent RU 186960 U1, publication 2019 Feb. 11), which provides an endodontic file (endofile) comprising a shank for inserting in an endodontic motor handpiece, and a core of twisted metal strands secured in the shank, a portion of the core being surrounded by a braid made of helically wound wire, whereby the directions of twisting of the core strands and the helical winding are identical, the helical wire is wound tightly over the core, without a gap, the braid due to the processing of its outer surface is being tapered with its apex facing the exposed end of the core, which allows using a helically wound wire in the form of a "screw" during rotation of the endofile, to bring out the products formed during the tooth canal treatment. At the braid-free end of the core, a brush is formed from the core strands, which opens under the influence of centrifugal force, while the ends of the strands end in a spherical rounding. The core strands may be made of stainless steel or a nickel-chromium alloy, from which the helical wire may also be made. The core may include 6-49 strands having a diameter of 0.02 to 0.07 mm. The endofile is used at a rotation speed of 600 to 3000 rpm. The proposed technical solution allows to somewhat simplify the design of the endofile and improve the quality of treatment by reducing the negative impact on the channel walls by the core strands, however, the presence of an unbonded end of the helically wound wire on the side of the exposed end of the core creates the possibility of damaging the channel walls when removing the endofile from the channel. In addition, at low turns of the endofile, there is a risk of incomplete opening of the free ends of the core strands, which negatively affects the quality of cleaning the channels.

SUMMARY OF THE INVENTION

The technical problem solved by the proposed invention is the creation of an endofile that improves the quality of cleaning of tooth root canals and reduces the risk of injury during the treatment.

The above technical effect is achieved by that, unlike the known endofile comprising a shank for inserting in an endodontic motor handpiece, and a core of twisted metal strands secured in the shank, provided with an outer braid made of wire wound over the core, the length of the braid being less than the length of the core, and a brush of core strands being formed on the braid-free end of the core, novel is the winding of the wire of the outer braid being made in four layers, the winding of the first and third layers being made in the direction from the shank to the brush without a gap between adjacent coils in each layer, and the winding of the second and fourth layers being made in the opposite direction, providing the possibility of securing both ends of the braid wire in the shank, the winding pitch in the second and fourth layers being 8 to 10 times greater than the winding pitch in the first and third layers of the braid, the winding length of the third and fourth layers in the direction from the shank to the brush being less than the winding length of the first and second layers, the core being made of three twisted elastic tungsten wires, the open ends of which, located in the braid-free portion of the core, are of a cylindrical helix shape and curved in the form of a conical helix with an increasing pitch of turns for each strand of the core.

Also novel is a method for cleaning root canals using the claimed endofile, in which, unlike known art, the curved ends of the brush wires are inserted into the canal separately and sequentially one after another with the motor turned off, pressing each inserted wire against the canal walls during the insertion of the file.

Furthermore, the winding length of the third and fourth layers in the direction from the shank to the brush is less than one-third of the winding length of the first and second layers.

Furthermore, the winding of the second layer of the braid forms an encircling coil on the side adjacent to the brush to keep the brush wires from unwinding.

Furthermore, each core wire has a diameter of 0.08 to 0.12 mm.

Furthermore, the outer braid is made with tight winding.

Furthermore, the file is designed to operate at a speed of 500 to 5500 rpm.

Furthermore, the outer braid is made of tungsten wire.

The winding of the wire, when the first and third layers of the outer braid are wound in the direction from the shank to the brush without a gap between adjacent coils in each layer, and the second and fourth layers are wound in the opposite direction, makes it possible to secure both ends of the braid wire in the shank, which eliminates the risk of injury to the channel walls by the open end of the helical winding of the wire.

In addition, winding of the outer braid of four layers makes it possible to provide the necessary stiffness of the core if it has three braids made of thin tungsten wire having a diameter of 0.08 to 0.12 mm.

Moreover, winding of the outer braid of different winding pitch of its layers, i.e. when the winding pitch in the second and fourth layers is 8 to 10 times greater than the winding pitch in the first and third layer of the braid, allows adjusting the stiffness of the core.

Winding of the third and fourth layers of the outer braid having a length in the direction from the shank to the brush less than the length of the winding of the first and second layers in the said direction, on the one hand, increases the strength of the file at the point where the core is secured at the shank, and on the other hand, does not interfere the insertion of the file into the tooth root canal.

Manufacture of the core having three twisted elastic tungsten wires, the open ends of which are located in the braid-free portion of the core, optimizes the design of the core, since a smaller number of strands does not provide sufficient filling density of the tooth canal with the brush formed from the free ends of the core strands for high-quality cleaning of the canal, and a large number of strands will contribute to the formation of excessive filling density, which can cause blockage of the canal and breakage of the brush bristles.

The use of tungsten for the manufacture of core strands provides, on the one hand, the necessary stiffness and elasticity of the core strands, and on the other hand, minimizes the cross section of the strands without compromising their stiffness and elastic qualities.

Giving the open ends of the core strands a shape of a cylindrical helix, which is curved in the form of a conical helix with an increasing pitch of turns for each core strand, makes it possible to form a spatial structure in the tooth channel, which will provide contact with the channel walls by the curved portions of the open ends of the strands, and not by the edges thereof. In addition, this will make it possible to arrange the curved open ends of the strands in the channel in such a way that, when the file is rotated, on the one hand, ensure contact of the ends of the strands over the entire area of the channel walls, and on the other hand, avoid the risk of blocking the channel and breaking the strands.

Insertion of the curved ends of the brush wires into the channel separately and sequentially one after another with the motor turned off, with each inserted wire pressed against the walls of the channel during the file insertion, ensures the insertion of the brush wires into the channel when the brush is open.

The winding length of the third and fourth layers in the direction from the shank to the brush being less than one-third of the length of the winding of the first and second layers allows to increase the stiffness of the file at the point of attachment of the core to the shank and the absence of structural obstacles for inserting the file into the tooth canal at the working length.

The helical winding having an encircling coil on the side adjacent to the brush keeps the brush wires from unwinding.

The wires having a thickness of 0.08 to 0.12 mm for the manufacture of the core provides sufficient stiffness and elasticity of the core strands while minimizing its cross section.

The outer braid having a tight winding helps to ensure the required stiffness of the core.

The file having the possibility of its operation at a speed of 500 to 5500 rpm ensures its operability at a given speed of rotation.

The outer braid being made of tungsten wire allows, if necessary, to increase the stiffness characteristics of the outer braid.

EMBODIMENT OF THE INVENTION

Figure 1:
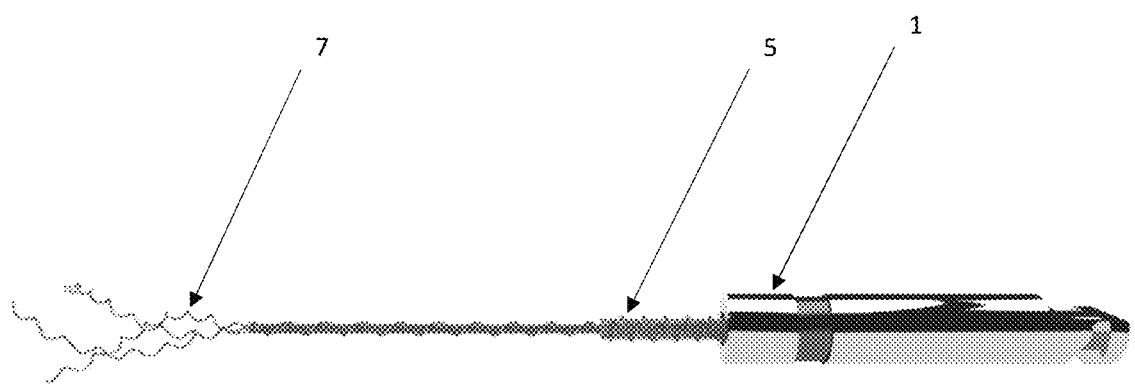
FIG. 1 is a general view of a finishing endofile.
Figure 2:
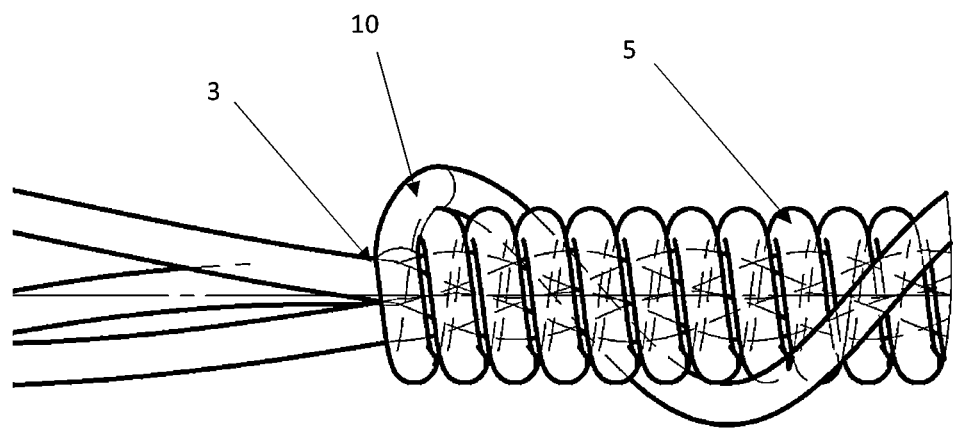
FIG. 2 is a general view of an open end of a core of the endofile.
Figure 3:
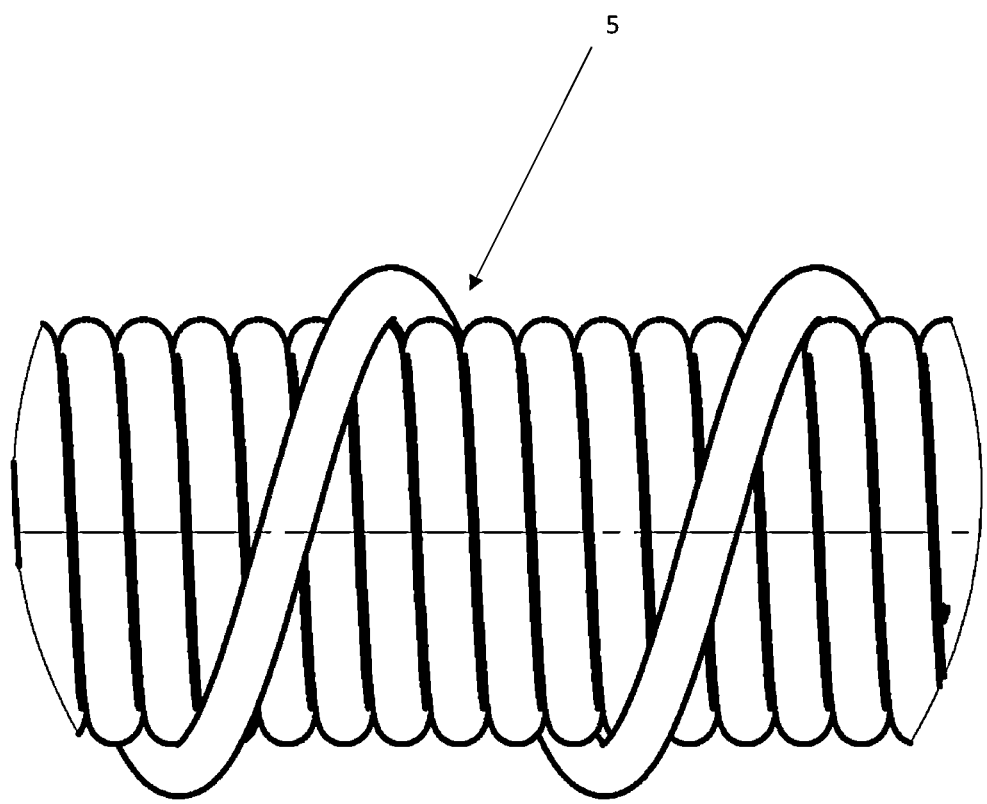
FIG. 3 is a general view of a closed end of a core of the endofile.
Figure 4:
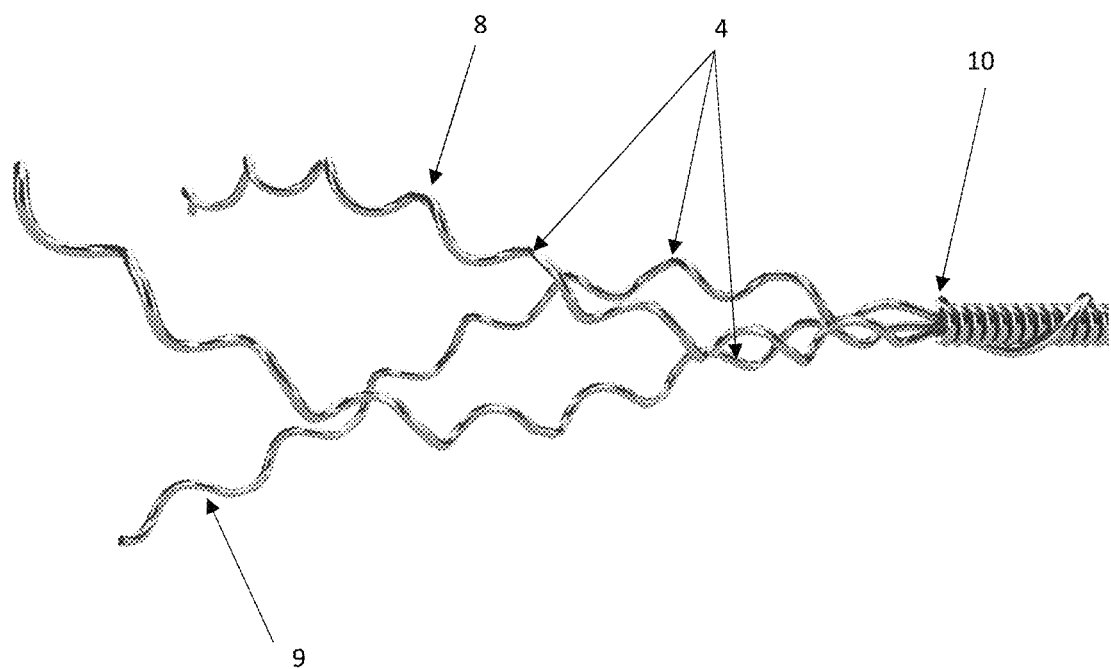
FIG. 4 is a general view of an exposed portion of the core strands.
Figure 5:
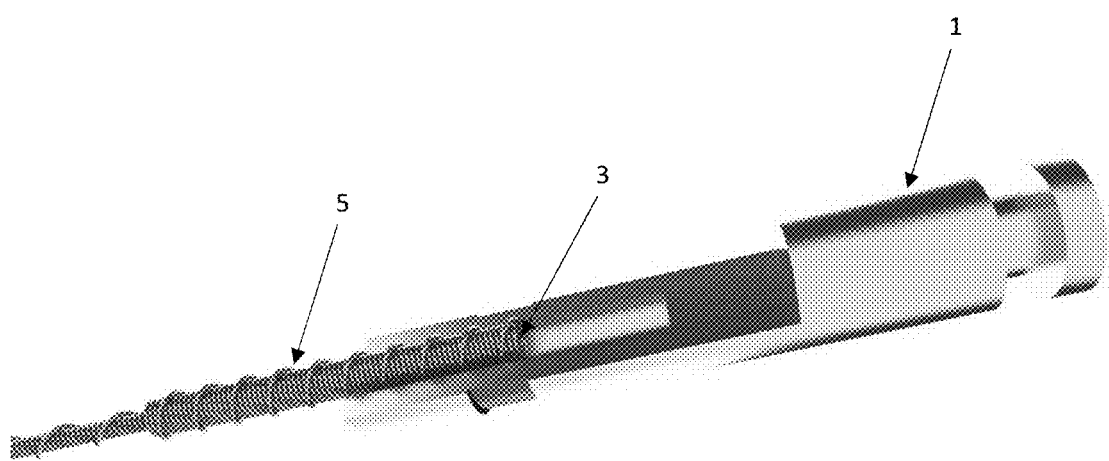
FIG. 5 is a cross-sectional general view of the core and braid securement in a shank.
Figure 6:
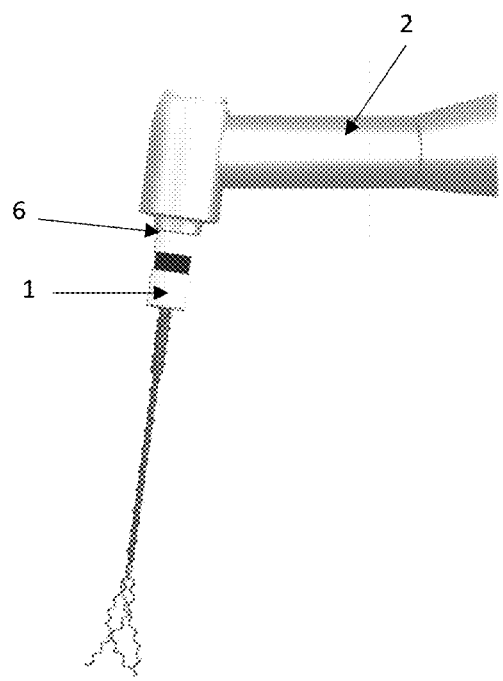
FIG. 6 is a general view of an assembled file with an endodontic motor handpiece.

An endodontic file comprises a shank 1 for inserting in an endodontic motor handpiece 2, a core 3 of twisted metal strands 4 and an outer braid 5 of the core 3 made of wire wound over the core 3, the core and the braid being secured in the shank. The strands of the core and the braid wire wound on the core may be secured in the shank by pressing or adhesive bonding. The shank 1 is made of a hard material (for example, steel or brass) and is fixed in the handpiece of the endodontic motor by means of a tight detachable connection 6, for example, a collet, a lock or other device that provides a tight fixation of the shank in the handpiece. The length of the braid 5 is less than the length of the core 3, the braid itself is made of wire wound in four layers, whereby the first and third layers are wound in the direction from the shank to the brush without a gap between adjacent coils in each layer, the second and fourth layers being wound in the opposite direction, which allows both ends of the braid wire to be secured in the shank. The winding pitch in the second and fourth layers is 8 to 10 times greater than the winding pitch in the first and third layers of the braid, the winding length of the third and fourth layers in the direction from the shank to the brush is less than the winding length of the first and second layers and may be about one-third of its length. The core 3 is made of three twisted elastic tungsten wires 4, the open ends of which being located in the braid-free portion of the core, form a brush 7. Whereby, the ends of the wires that form the brush, are given a shape of a cylindrical helix 8, which is curved in the form of a conical helix 9 with an increasing pitch of turns for each strand of the core. The winding of the second layer of the braid forms an encircling coil 10 on the side adjacent to the brush 7 to keep the brush wires from unwinding. Each core wire has a diameter of 0.08 to 0.12 mm. The outer braid is made with tight winding on the core, and the diameter of the braid is 0.4 to 1.05 mm. The braid may be made of tungsten or another metal that provides the necessary stiffness characteristics, with a wire diameter of 0.08 to 0.12 mm. The endodontic file is designed to operate at a rotation speed of 500 to 5500 rpm.

Whereby, the choice of tungsten as a material for the manufacture of the core strands and providing a given shape of the brush wires is determined by the high stiffness requirements for the brush wires of the finishing endodontic file, which must effectively clean any tooth root canals. At the same time, during operation, each brush wire is subject to multiple flexing loads, since the number of its flexes during the treatment of one root canal, even at a relatively low file rotation speed of 5500 rpm, is about 10,000 times. Given that the largest tooth has four channels, each brush wire will be flexed about 40,000 times at an angle of 60-90 degrees to treat it. The materials currently used for the manufacture of similar devices, stainless steel, nitinol, etc., are not able to withstand such a load for a long time due to cyclic fatigue and excessive torsional force. To prevent their destruction, it is necessary to use other materials with higher mechanical properties. Such a material, as found by the authors of the claimed invention, is tungsten. The peculiarity of the use of tungsten is that it provides flexibility and "resource capacity" in small-diameter products, which is confirmed by experimental studies of the claimed finishing endodontic file.

Formation of the exposed portion of the core in a brush form, each wire of which has a structure pattern of a double helix (cylindrical and conical), in which the bends are offset relative to each other, prevents the brush from twisting into a single cable and allows to maintain its alignment with the longitudinal axis of the root canal during rotation in any direction, creating a web-like pattern. In doing so, regardless of the force, speed and direction of rotation, the brush always remains unwound.

Finishing endodontic file (brush), as a rule, can be operated in three modes: disinfection, activation and retreatment.

In all modes, after the file is inserted in the endodontic motor handpiece with the motor turned off, the curved ends of the brush wires are inserted separately and sequentially one after another into the tooth canal with each inserted wire being pressed against the canal walls during the file insertion after which another portion of the core is inserted into the channel to the working length. Then, in the modes of disinfection and activation, the tooth canal is filled with an active chemical, mainly sodium hypochlorite, and a structure formed from the brush wires. Rotating inside the channel at a speed of 500 to 5500 rpm, the exposed end of the file acts as a brush. In doing so, the bends of the brush wires form a stable structure that can follow the anatomical structure of the tooth root, regardless of the profile of the walls of the tooth canal and its shape. Intensively rotating, the wires (brushes) clean off the smeared layer from the walls of the root canal, which usually consists of dentin particles, remnants of the vital or necrotic pulp, bacteria and traces of irrigation solutions. In addition, active mixing of the solution contributes to its activation, i.e. acceleration of the chemical process.

When operated in the retreatment mode, the brush wires, rotating, first scrape off the old filling material from the walls of the canal of the tooth, after which the canal is filled with an active chemical substance, for example, a gutta-percha solvent of the "solvadent" type. The proposed technical solution allows to provide high-quality and safe treatment, reduce the risk of injury during treatment, and also increase the service life of the endodontic file.

REFERENCE NUMERALS

1—shank;
2—endodontic motor handpiece;
3—core;
4—metal braids;
5—outer braid of a core;
6—tight detachable connection;
7—brush;
8—cylindrical helix;
9—conical helix;
10—encircling coil.

The invention claimed is:

1. A finishing endodontic file comprising:
a shank for inserting into an endodontic motor handpiece, and
a core comprising a length of twisted metal braids secured in the shank, wherein:
the core is provided with an outer winding made of a wire, having two ends, wound over the core,
the outer winding having a length less than the length of the core, a brush of the core braid is formed at an outer winding-free end of the core,
the outer winding comprises four layers of wire, wherein:
a winding of first and third layers is made in a direction from the shank to the brush without a gap between the adjacent coils in each first and third layer,
a winding of second and fourth layers is made in an opposite direction, providing for securing both ends of the outer winding wire in the shank,
a winding pitch in the second and fourth layers is 8 to 10 times greater than a winding pitch in the first and third layers of the outer winding, and
a winding length of the third and fourth layers in a direction from the shank to the brush is less than a winding length of the first and second layers, and
the core is made of three twisted elastic tungsten wires, open ends of which form the brush and are located in the outer winding-free end of the core, and are of a cylindrical helix shape and curved in the form of a conical helix with an increasing pitch of turns for each strand of the core.

2. The finishing endodontic file according to claim 1, wherein the winding length of the third and fourth layers in the direction from the shank to the brush is less than one-third of the winding length of the first and second layers.

3. The finishing endodontic file according to claim 1, wherein the winding of the second layer of the outer winding forms an encircling coil adjacent to the brush to keep the brush wires from unwinding.

4. The finishing endodontic file according to claim 1, wherein each core wire has a diameter of 0.08 to 0.12 mm.

5. The finishing endodontic file according to claim 1, wherein the file is configured to operate at a speed of 500 to 5500 rpm.

6. The finishing endodontic file according to claim 1, wherein the outer winding is made of tungsten wire.

7. A method for cleaning root canals using a finishing endodontic file according to claim 1, wherein curved ends of the brush are inserted into the canal separately and sequentially one after another with a motor turned off, each inserted wire being pressed against walls of the canal during the insertion of the file.

* * * * *

UNITED STATES PATENT AND TRADEMARK OFFICE
CERTIFICATE OF CORRECTION

PATENT NO. : 12,502,248 B2  
APPLICATION NO. : 18/494987  
DATED : December 23, 2025  
INVENTOR(S) : Vasily Olegovich Vdovin Page 1 of 1

It is certified that error appears in the above-identified patent and that said Letters Patent is hereby corrected as shown below:

In the Claims

Claim 1, Column 8, Line 1, "a core comprising a length of twisted metal braids secured" should read --a core comprising a length of twisted metal braid secured--.

Signed and Sealed this  
Third Day of February, 2026

John A. Squires  
*Director of the United States Patent and Trademark Office*